United States Patent [19]

Conrad

[11] 4,011,939
[45] Mar. 15, 1977

[54] CLOSED LOOP CLEATED BELT/GROOVED PULLEY CONVEYOR SYSTEM

[75] Inventor: René A. Conrad, Woodside, Calif.

[73] Assignee: Dynaloc Corporation, San Mateo, Calif.

[22] Filed: Sept. 26, 1975

[21] Appl. No.: 616,907

[52] U.S. Cl. .................................. 198/840
[51] Int. Cl.² ................................. B65G 15/62
[58] Field of Search .......... 198/202, 193, 837, 840, 198/842; 74/233, 234, 240, 241

[56] References Cited

UNITED STATES PATENTS

| | | | |
|---|---|---|---|
| 207,626 | 9/1878 | Sargent | 198/202 |
| 2,855,093 | 10/1958 | Ek | 198/193 |
| 3,050,178 | 8/1962 | Stone | 198/193 |
| 3,196,701 | 7/1965 | Morrow | 198/202 |

Primary Examiner—Evon C. Blunk
Assistant Examiner—Joseph E. Valenza
Attorney, Agent, or Firm—Boone, Schatzel, Hamrick & Knudsen

[57] ABSTRACT

A closed loop conveyor system for transporting loads from one point to another and including a drive pulley and a return pulley, either or both pulleys having a plurality of cleat receiving annular grooves, and a conveyor belt having an exterior load carrying surface, and an interior surface with a plurality of longitudinal rows of cleats protruding therefrom, the belt being disposed around the drive and return pulleys and adapted to be driven by the drive pulley. The interaction between the pulley grooves and cleats provides superior drive force transmission from pulley to belt and provides positive belt alignment even under severe off-center or side load conditions.

11 Claims, 11 Drawing Figures

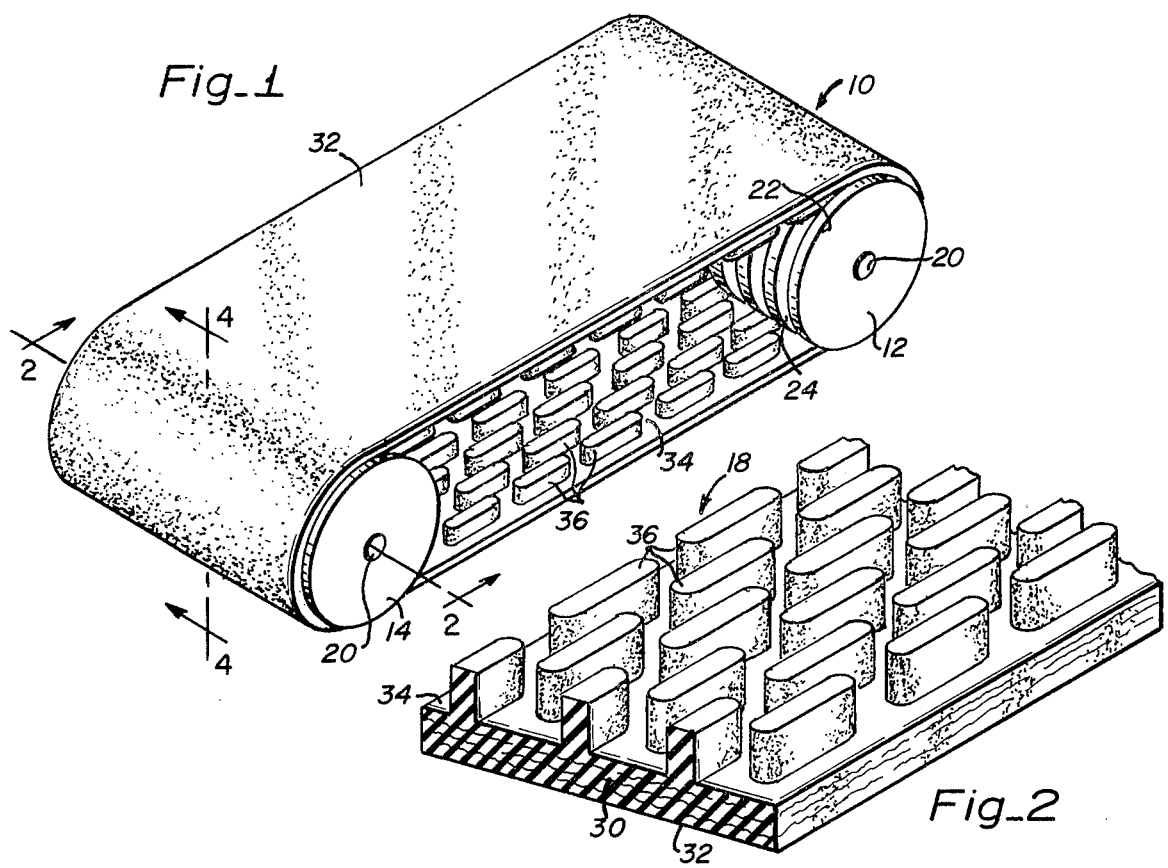
Fig_1
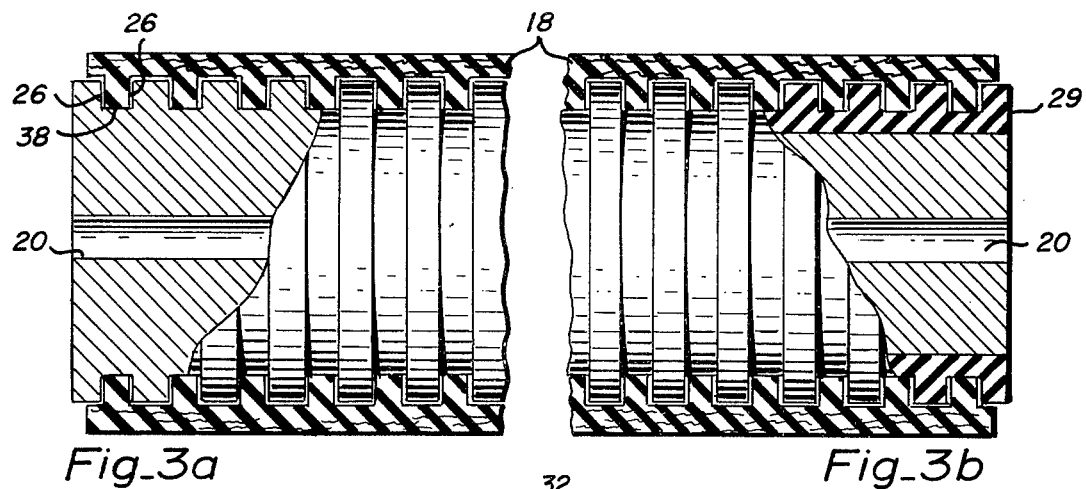
Fig_2
Fig_3a  Fig_3b
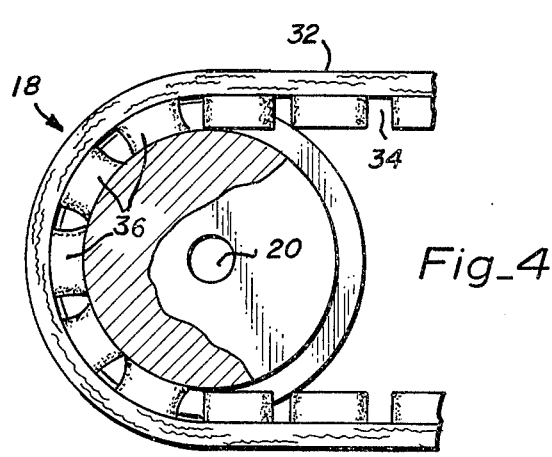
Fig_4

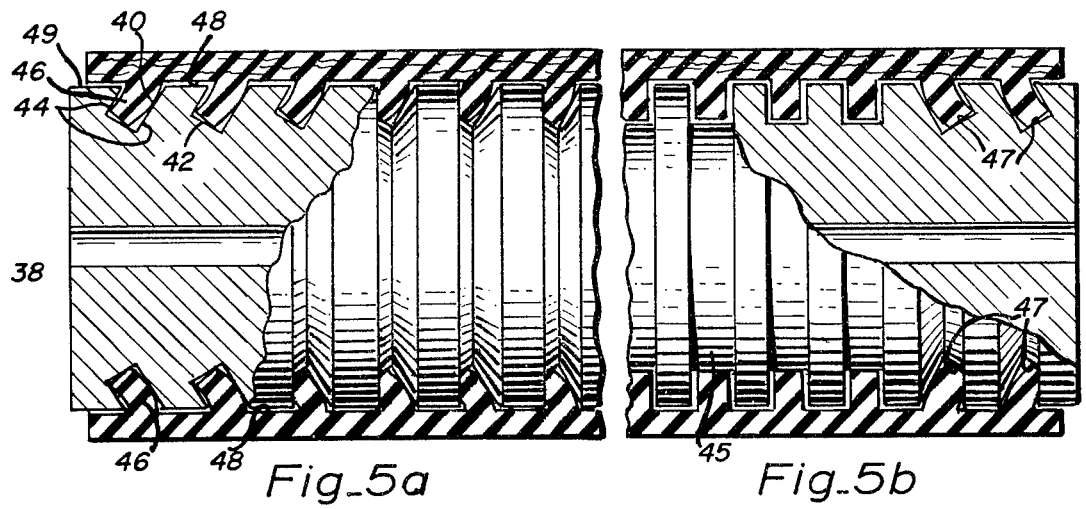
Fig_5a  Fig_5b
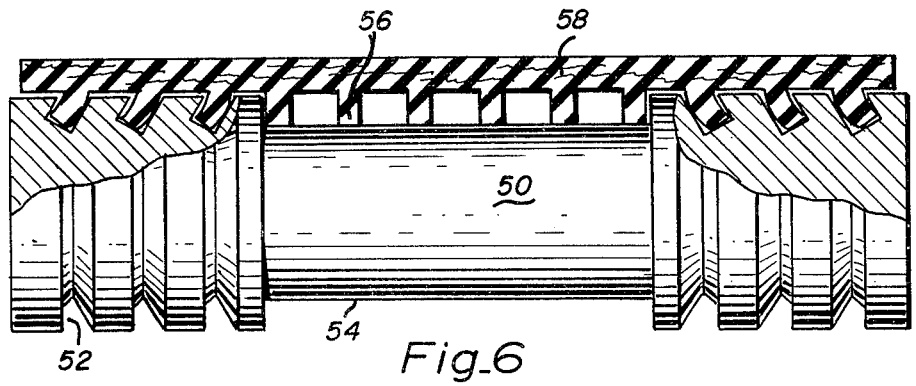
Fig_6
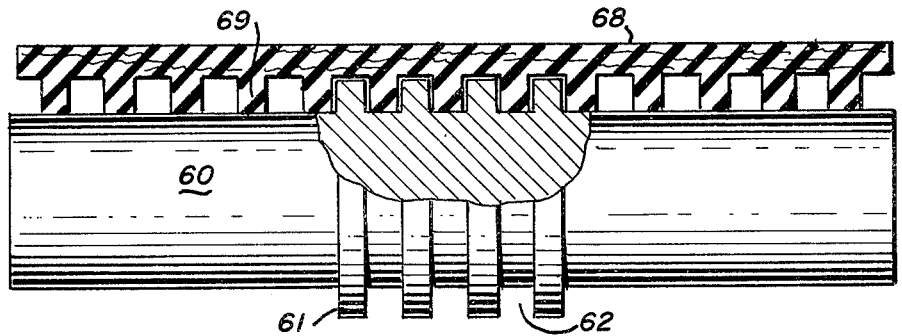
Fig_7
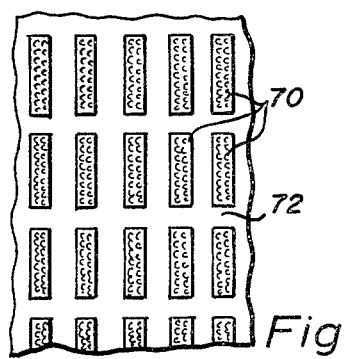
Fig_8
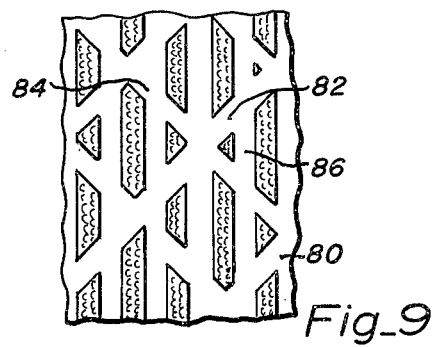
Fig_9

CLOSED LOOP CLEATED BELT/GROOVED PULLEY CONVEYOR SYSTEM

BACKGROUND OF THE INVENTION

1. Field of the Invention

The present invention relates generally to conveyor systems and, more particularly, to a closed loop conveyor system including pulleys having annular grooves and a conveyor belt including cleats arranged in longitudinal rows for mating with the pulley grooves to provide improved frictional drive contact and belt-to-pulley alignment and to reduce cross tensions in the belt.

2. Description of the Prior Art

Heretofore, endless belts and pulleys used in closed loop heavy load conveyor systems have usually had smooth interior pulley engaging surfaces and the pulleys used to drive these belts have had smooth driving surfaces which are crowned to keep the belt centered over the pulley. Because of the smooth surfaces, the entire width of the interior belt surface frictionally contacts the pulley surface as the belt passes over the pulley. In cases where off-centered loads are carried by the belt, or where the belts are side-loaded, it is not unusual to have cross tensions build up in the belt which are substantial enough to overcome the centering action of the pulley crowns, causing the belt to be thrown off of the pulleys.

In those applications where the conveyor is used to carry loads up an incline from one level to another, slippage between the belt and the driving pulley often presents a problem. This has usually been overcome by increasing the belt tension and/or increasing the diameter of the drive pulley. However, these solutions frequently reduce the useful life of the belt and cause increased bearing wear in the pulleys. This is a particularly severe consequence in the case of larger diameter pulleys which usually cost substantially more to manufacture than pulleys of a smaller diameter. It should also be noted that these solutions frequently have an adverse effect on the effectiveness of the prior art belt centering techniques mentioned above.

SUMMARY OF THE PRESENT INVENTION

Accordingly, it is an object of the present invention to provide a closed loop conveyor system having improved alignment and frictional drive characteristics.

Another object of the present invention is to provide a closed loop conveyor system which is ideally suited for applications requiring both forward and reverse drive operations.

Still another object of the present invention is to provide a closed loop conveyor system which is ideally suited for heavy load and lift applications.

Briefly, the conveyor system of the present invention includes a cylindrical drive pulley and a cylindrical return pulley having outer surfaces with a plurality of annular grooves of a predetermined depth. A plurality of idler rollers may also be included. A conveyor belt is disposed around the drive and return pulleys (and any idler rollers) and includes an external load-carrying surface and an interior pulley-engaging surface having a plurality of rows of spaced-apart, inwardly protruding, groove-engaging cleats. The cleats have a height slightly larger than the pulley groove depth so that the interior belt surface remains out of frictional contact with the outer pulley surfaces.

In an alternative embodiment the grooves in the pulleys are inclined to improve the frictional drive engagement between the belt and pulleys.

An advantage of the present invention is that conveyor belt alignment control is substantially improved.

Another advantage of the present invention is that the increased friction between the belt and the pulleys permits the use of drive pulleys having smaller diameters.

A further advantage of the present invention is that it may alternatively be driven in forward and reverse directions without requiring additional adjustments.

A still further advantage of the present invention is that it may be used to pull unusually heavy loads.

The foregoing and other objects, features and advantages of the invention will be apparent from the following detailed description of the embodiments illustrated in the several figures of the drawing.

IN THE DRAWING

FIG. 1 is a perspective view illustrating a closed loop conveyor system in accordance with the present invention;

FIG. 2 is a fragmentary perspective view showing the interior side of the conveyor belt shown in FIG. 1;

FIGS. 3a and 3b are fragmentary longitudinal cross-sectional views taken along the line 3—3 of FIG. 1, with portions broken away for clarity;

FIG. 4 is a fragmentary cross-sectional view taken along the line 4—4 of FIG. 1;

FIGS. 5a and 5b are fragmentary longitudinal cross-sectional views of alternative pulley embodiments wherein at least some of the grooves in the pulley are inclined;

FIGS. 6 and 7 are fragmentary longitudinal cross-sectional views showing other alternative pulley embodiments in accordance with the present invention; and FIGS. 8 and 9 are plan views illustrating alternative cleat configurations for conveyor belts used in accordance with the present invention.

DETAILED DESCRIPTION OF THE PREFERRED EMBODIMENT

In FIG. 1 of the drawing, a perspective view of a closed loop conveyor system in accordance with the present invention is indicated by the reference character 10. System 10 includes a cylindrical drive pulley 12, a cylindrical return or tail pulley 14, an idler roller 16 and an endless belt 18 disposed around the drive and return pulleys.

Each of the pulleys 12 and 14 includes a central bore 20 and a cylindrical outer surface 22 having a plurality of annular grooves 24 disposed along the axial length of the pulley. The bore 20 of each pulley is adapted to receive a shaft (not shown) about which the pulley rotates. As more clearly shown in FIG. 3a, each groove 24 is formed by a pair of parallel side surfaces 26 which lie in planes normal to the pulley axis, and a bottom surface 28, and has a predetermined depth D. In the illustrated embodiment the grooves 24 are machined into the pulley surface. However, grooved flexible lagging could be affixed to the external surface of a smooth-surfaced pulley as shown at 29 in FIG. 3b.

The belt 18 has a flexible carcass 30, which may or may not be fabric reinforced, with an exterior, load-carrying surface 32 and an interior surface 34. Materials found suitable for use in fabricating the belt include rubber, neoprene, Butadien, Buta-N and many tough but flexible synthetic materials. A plurality of deformable, resilient groove-engaging cleats 36 protrude inwardly from the interior surface 34 and are arranged in a matrix of rows aligned in columns in the direction of belt travel. In the preferred embodiment, the cleats in one row are staggered relative to the cleats in the adjacent rows, as is more clearly illustrated in FIG. 2.

Cleats 36 are elongated in the direction of the rows and have a predetermined height H which is slightly larger than the depth D of the grooves 24. This height difference causes the interior surface 34 to be held out of contact with the pulley surfaces 22 as the belt passes thereabout. In the usual case, the cleat height H is equal to or greater than the carcass thickness.

The spacing between rows is related to the spacing of the pulley grooves. However, the cleat spacing in the row direction may be selected such that the distal ends of adjacent cleats barely contact one another (see FIG. 4) as the belt deforms around the pulleys 12 and 14. Hence, the pulleys 12 and 14 may have diameters that are relatively small compared to the diameters of those pulleys which are presently used in conveyor systems.

By way of example, in one embodiment suitable for use with three inch diameter pulleys, the cleats have a height of 3/16 inch, a length of ⅝ inch, a width of ⅛ inch, and a cleat-to-cleat separation of ⅛ inch. In this case the pulley groove depth is 1/32 inch less than the cleat height, or 5/32 inch.

Referring now to FIG. 5a, an alternative embodiment 38 of the pulleys shown in FIG. 1 is illustrated in part. In this embodiment the grooves 40 are inclined. Each groove may be defined as being formed by a bottom surface 42 and two spaced-apart side surfaces 44 which are frusto-conically shaped. As in the first described embodiment, the depth of the grooves 40 and the height of the cleats 46 are selected so as to maintain the interior belt surface 48 out of frictional contact with the pulley surface 49. In this arrangement, although surfaces 48 and 49 may occasionally come into contact under heavy load conditions, such contact is only incidental and provides no intentional driving function. The angular relationship of the grooves provides improved frictional contact between the belt cleats 46 and the grooves 40 as the resilient cleats deform laterally and engage the side walls 44 upon entering the grooves. Typically, the grooves are inclined at angles ranging between 5° and 15° relative to the pulley diameter, depending upon the particular application.

Alternately, as shown in FIG. 5b some of the grooves may be annular as indicated at 45 while others near the ends of the pulley are inclined as illustrated at 47.

In FIGS. 6 and 7, still other alternative embodiments of the pulleys are illustrated. FIG. 6 depicts a pulley 50 with inclined grooves 52 near its ends and a smooth pulley surface 54 extending along its central portion. The diameter of central portion 54 is selected so that engagement by cleats 56 maintains belt 58 flat along the axial length of pulley 50. It is to be understood, however, that pulley surface 54 could be shaped other than cylindrical in order to provide a slight troughing of belt 58 if this were desired. Pulley 50 could be used as a drive pulley, a tail pulley or an idler pulley, and the number of grooves 52 may be selected to fit a particular application.

In FIG. 7, only the central portion of the pulley 60 is provided with angular grooves 62, and each end portion is of a plain cylindrical configuration having the same diameter as the grooves 62. This embodiment may be thought of as being comprised of a cylindrical roller having a plurality of annular rings 61 around its periphery with the separating spaces therebetween forming the grooves 62. This embodiment is particularly suitable for idler use on long conveyors, since the grooves 62 will provide for good belt alignment while the end surfaces 64 will provide a support for the belt 68 when engaged by the cleats 69.

In FIGS. 8 and 9, alternative cleat arrangements are illustrated. FIG. 8 is a fragmentary plan view of the under side of a cleated belt having rectangularly shaped cleats 70 arranged in an ordered rectangular pattern of rows and columns. Although this cleat pattern facilitates manufacture, as by longitudinal and transverse sawing, it suffers from the disadvantage that belt fatigue is likely to develop along the transverse separations 70 between cleats.

The diagonally arranged cleat design illustrated in FIG. 9 at 80 overcomes the disadvantage mentioned relative to the FIG. 8 embodiment in that the belt flexure in wrapping around the rollers is not directly along a cleat separation line. However, like the FIG. 8 embodiment, this design can be manufactured by saw cuts along the diagonals 82 and 84, and along the longitudinal lines 86. These cleat configurations may also be fabricated from an extruded belt initially having a plurality of ribs in the direction of belt travel by gang-sawing the ribs to form the appropriate spacers. Alternatively, it should be recognized by those skilled in the art that the belts may be molded to form the desired cleat configurations.

Although only one idler roller 16 is illustrated in FIG. 1, a typical closed loop conveyor system may utilize many such rollers. Normally, certain pulleys and idler rollers in the system will be grooved while the remainder will have smooth nongrooved outer surfaces. Hence, the cleats must be fabricated from a material firm enough to enable the cleats to roll over the smooth outer surfaces of the nongrooved pulleys without substantial compressive or lateral deformation. It has been found that materials having a durometer in the range of between 50 to 90 have sufficient stiffness to enable the cleats to roll over the smooth pulley surfaces without deleterious deformation. At the same time, materials of this durometer are sufficiently flexible to permit as much as three times more surface area to contact the pulley surfaces (within the grooves) than would be the case with smooth belt and pulley surfaces.

Although it is preferable that the cleats be longer in length (along the direction of belt travel) than in width as for example of oval or rectangular configuration, and that the laterally adjacent cleats be staggered as illustrated in FIGS. 1, 2 and 9, it will be appreciated that normal cleats in either square or diagonal arrays could also be utilized.

From the illustrations of FIGS. 1–9, it can be seen that the previously described belt and pulley combinations accomplish several ends. First, the cleat and groove engagement provides positive belt alignment which can only be overome by extraordinary side loading forces because of the lateral support provided by the pulley grooves. Secondly, the flexible cleats individually engage the groove surfaces to provide good frictional drive between pulley and belt. Moreover, under heavy load conditions the cleats will compress vertically and expand laterally to engage the groove sides and increase the frictional contact between pulley and belt. And finally, the differential between groove depth and cleat height keeps the interior belt surface off of the pulley face and eliminates the cross tensions usually build up in the surface by off-centered loads. Any cross-tension forces are absorbed by the cleats.

The present invention permits rapid reversal of belt direction without alignment adjustment and can pull loads as much as four times greater than prior art smooth belt and pulley systems. Furthermore, the aligning action of the pulley grooves eliminates the need for crowning of the pulleys. These features make the system ideally suited for heavy load, ramped conveyor applications and applications where materials are pulled or pushed off of the belt. A further incidental feature of the present invention is that the flexible cleats provide a cushioning action between load and pulleys which tends to reduce damage to both belt and load.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A closed loop conveyor system comprising:
a generally cylindrical drive pulley and a generally cylindrical return pulley, at least one of said drive and return pulleys having a plurality of annular grooves of predetermined depth formed in its outer surface along a portion of its axial length with some of said grooves being inclined and formed by a pair of spaced-apart frusto-conical side surfaces and a bottom surface; and
a conveyor belt disposed around said drive and return pulleys and including a carcass having an exterior load-carrying surface and an interior surface with a plurality of integrally formed, spaced-apart, groove-engaging cleats protruding therefrom, said cleats being aligned in at least one row formed in the direction of belt travel, said cleats being elongated in the row direction and having a predetermined height slightly larger than said predetermined depth, whereby said cleats engage said bottom surface and cause said internal surface to remain out of frictional contact with said outer surfaces as said belt passes around said pulleys.

2. A closed loop conveyor system as recited in claim 1 wherein said inclined grooves are inclined inwardly toward the center of said pulley.

3. A closed loop conveyor system as recited in claim 2 wherein said grooves are inclined at an angle of between 5° and 15° relative to a diameter of the pulley.

4. A closed loop conveyor system as recited in claim 1 wherein said carcass has a thickness that is substantially equal to or less than said predetermined height.

5. A closed loop conveyor system as recited in claim 1 wherein said cleats are arranged in a rectangular matrix.

6. A closed loop conveyor system as recited in claim 1 wherein said cleats are arranged in a matrix with cleats in one row being staggered relative to cleats in adjacent rows.

7. A closed loop conveyor system as recited in claim 1 wherein said cleats are aligned in a plurality of rows and collectively form a diamond-shaped pattern.

8. A closed loop conveyor system as recited in claim 1 wherein said cleats are flexible and spaced apart a distance such that the distal ends of adjacent cleats contact each other as said belt passes around said pulleys.

9. A closed loop conveyor system as recited in claim 1 and further comprising a cylindrical idler roller having a plurality of spaced-apart annular rings disposed along its midportion, the space between said rings forming annular grooves for receiving said cleats.

10. A closed loop conveyor system as recited in claim 1 wherein the annular grooves of at least one of said pulleys are inclined inwardly along portions of the length of the pulley nearest each end.

11. A closed loop conveyor system as recited in claim 10 wherein the midportion of said pulley includes annular grooves that are not inclined.

* * * * *